US006656052B2

(12) United States Patent
Abramopoulos et al.

(10) Patent No.: US 6,656,052 B2
(45) **Date of Patent: *Dec. 2, 2003**

(54) PROGRESSIVE GAMING METHOD

(76) Inventors: Frank Abramopoulos, 2373 Broadway, Apt. 1126, New York, NY (US) 10024; Jennifer Spano, 217 W. 16th St., Apt. C, New York, NY (US) 10011

( * ) Notice: Subject to any disclaimer, the term of this patent is extended or adjusted under 35 U.S.C. 154(b) by 151 days.

This patent is subject to a terminal disclaimer.

(21) Appl. No.: 09/731,609

(22) Filed: Dec. 7, 2000

(65) Prior Publication Data

US 2001/0003710 A1 Jun. 14, 2001

Related U.S. Application Data

(63) Continuation-in-part of application No. 09/196,418, filed on Nov. 19, 1998.

(51) Int. Cl.[7] .................................................. A63F 13/00

(52) U.S. Cl. ............................... 463/47; 463/27; 463/1; 273/148 R; 235/61 R

(58) Field of Search ................................ 463/1, 16–20, 463/25–27, 47; 700/90–93; 235/61 G

(56) References Cited

U.S. PATENT DOCUMENTS 5,393,061 A * 2/1995 Manship et al. .............. 463/27
5,630,753 A * 5/1997 Fuchs .......................... 463/12
5,749,785 A * 5/1998 Rossides ...................... 463/25
RE35,864 E * 7/1998 Weingardt ................... 463/28
6,283,473 B1 * 9/2001 Abramopoulos et al. ...... 463/1

OTHER PUBLICATIONS

Crevelt, Dwight, et al., Video Poker Mania!!, 1991, Chapter 3, Poker Percentages, pp. 49–76.
Legato, Frank, "Lock & Roll", Strictly Slots, Jul. 1999, pp. 58–.
Warrior, V.P., "The Truth About Progressives", Atlantic City Insider, Jun. 1999, p. 5.
Warrior, V.P., "Joker Wild Poker, 5K Jackpot", Strictly Slots, May 2000, pp. 70–71.

* cited by examiner

*Primary Examiner*—Jessica Harrison
*Assistant Examiner*—Aaron Capron
(74) *Attorney, Agent, or Firm*—Schweitzer Cornman Gross & Bondell LLP

(57) ABSTRACT

A method of increasing gaming activity and entertainment value of games with progressive jackpots including posting or publishing information items sufficient to determine a current expected progressive return of a progressive game, the information items being located on, or adjacent a location of, the game. The information items can include the current expected progressive return, or parameters such as the probability of hitting the progressive jackpot, the current amount of the progressive jackpot, the amount of the qualifying bet, and either the truncated return of the game, or the flat return of the game and the amount of the minimum reset value of the game. The method is suitable for progressive slot machines, Caribbean Stud poker, video poker and keno, and other games with progressive jackpots.

30 Claims, 1 Drawing Sheet

PROGRESSIVE GAMING METHOD

RELATED APPLICATIONS

This application is a continuation-in-part of U.S. patent application Ser. No. 09/196,418, filed Nov. 19, 1998, pending.

FIELD OF THE INVENTION

This invention pertains to the field of gaming, and in particular to the operation of progressive games and gaming machines.

BACKGROUND OF THE INVENTION

Gaming machines, and "reel" slot machines in particular, have been an important, profitable and entertaining part of the gaming industry since its inception. The profitability of a gaming machine is partly determined by the "return" of the machine, which, from a casino's (or other operator's) perspective is typically fixed. Therefore, to increase profits, a commercial gaming machine operator usually must increase the amount of gaming activity (or "handle") its machines attract. Operators have found that increasing the attraction of and interaction with gaming machines, as well as the entertainment value of the gaming machines, increases gaming activity. Thus, operators are continually striving, and competing with one another, to increase the attraction, interactivity and entertainment value of their gaming machines, including progressive reel slot machines.

Therefore, what is desired is a method of increasing the attraction and interactivity of progressive reel slot machines and other progressive gaming machines to thereby increase the entertainment value and gaming activity associated with these machines.

SUMMARY OF THE INVENTION

Reel slot machines are distinguished from other gaming machines with coin "slots" in that reel slot machines have a number of physical (or sometimes video) spinning reels with symbols (e.g., diamonds, oranges, etc.). Reel slot machines have a number of predetermined winning combinations which payout a certain amount when the combination appears on the "pay line" or other predetermined wining positions. Typically there is a "jackpot" winning combination and several lesser-paying winning combinations. The probabilities of hitting the jackpot and the lesser-paying winning combinations are fixed. The probability of hitting a lower-paying winning combination is greater than the probability of hitting a higher-paying winning combination. As will be explained further below, the "expected return" to the player of a reel slot machine having a predetermined jackpot amount is fixed.

The jackpot of a progressive reel slot machine increases with the amount of play the machine has received since the last payout of the progressive jackpot. Typically, the progressive jackpot is increased by a relatively small percentage of each bet (e.g., 1%). This is called the "progressive increment". The probability of hitting the progressive jackpot is fixed and is determined by the manufacturer or operator of the machine. However, as will be explained in detail below, from a mathematical standpoint the "current expected return" (from the player's perspective) of the progressive reel slot machine increases as the progressive jackpot increases. However, the player has no means to determine the return. The return of a progressive reel slot machine can be calculated if all of the critical parameters are known (such as the probability of hitting the progressive jackpot). However, casinos and other operators of progressive reel slot machines closely guard such information.

The invention comprises a method of operating progressive reel slot machines and other progressive games and gaming machines which allows players to determine the current expected progressive return of a given machine so that they can choose which machine they wish to play. Players will be attracted to such machines because they will be able to determine the current expected progressive return. The steps involved in determining the current expected progressive return would increase the interactivity of the players with the gaming machines. The process will entertain the players because they will have an active role in determining the return they receive for their bet.

Since the return of the progressive reel slot machine, from the operator's perspective, is fixed and does not change with respect to the amount of the progressive jackpot, the operator is not concerned with which machine, out of a group of its otherwise equivalent progressive reel slot machines, is played. The operator benefits by the increase in traffic and the overall increase in play of the group of machines. The player benefits by being able to choose his/her expected return and by the increase in entertainment value of the gaming machine.

In practice, the method involves publishing (or posting), preferably on or adjacent to the machine itself, either the current expected progressive return itself or information to allow the player to calculate the current expected return of the machine. The amount of the progressive jackpot is typically displayed on the machine. In addition, the qualifying or "maximum" bet required to qualify for the progressive jackpot is typically shown on the machine. The additional information required to determine the current expected progressive return of the machine is: (1) the probability of hitting the progressive jackpot, and (2) either (a) the "truncated return" of the slot machine (defined in the detailed description of the invention), or (b) the "flat return" of the slot machine (also defined below) and the minimum "reset" value of the progressive jackpot. These numbers (collectively referred to as the "critical parameters") can be combined and/or encoded to limit the disclosure of the critical parameters of the machine, or can be in "raw" form. The players are provided with a device to calculate the current expected progressive return based on the published critical parameters.

The invention also encompasses other methods which enable players to determine the current expected progressive return of a progressive reel slot machine. In addition, the methods are applicable to progressive reel slot machines having multiple progressive jackpots, and to other games and gaming machines having progressive awards, such as video poker, Caribbean Stud poker, progressive keno, and others.

BRIEF DESCRIPTION OF THE DRAWINGS

For a complete understanding of the above and other features of the invention, reference shall be made to the following detailed description of the preferred embodiments of the invention and to the accompanying drawings, wherein.

DETAILED DESCRIPTION OF THE INVENTION

Figure 1:
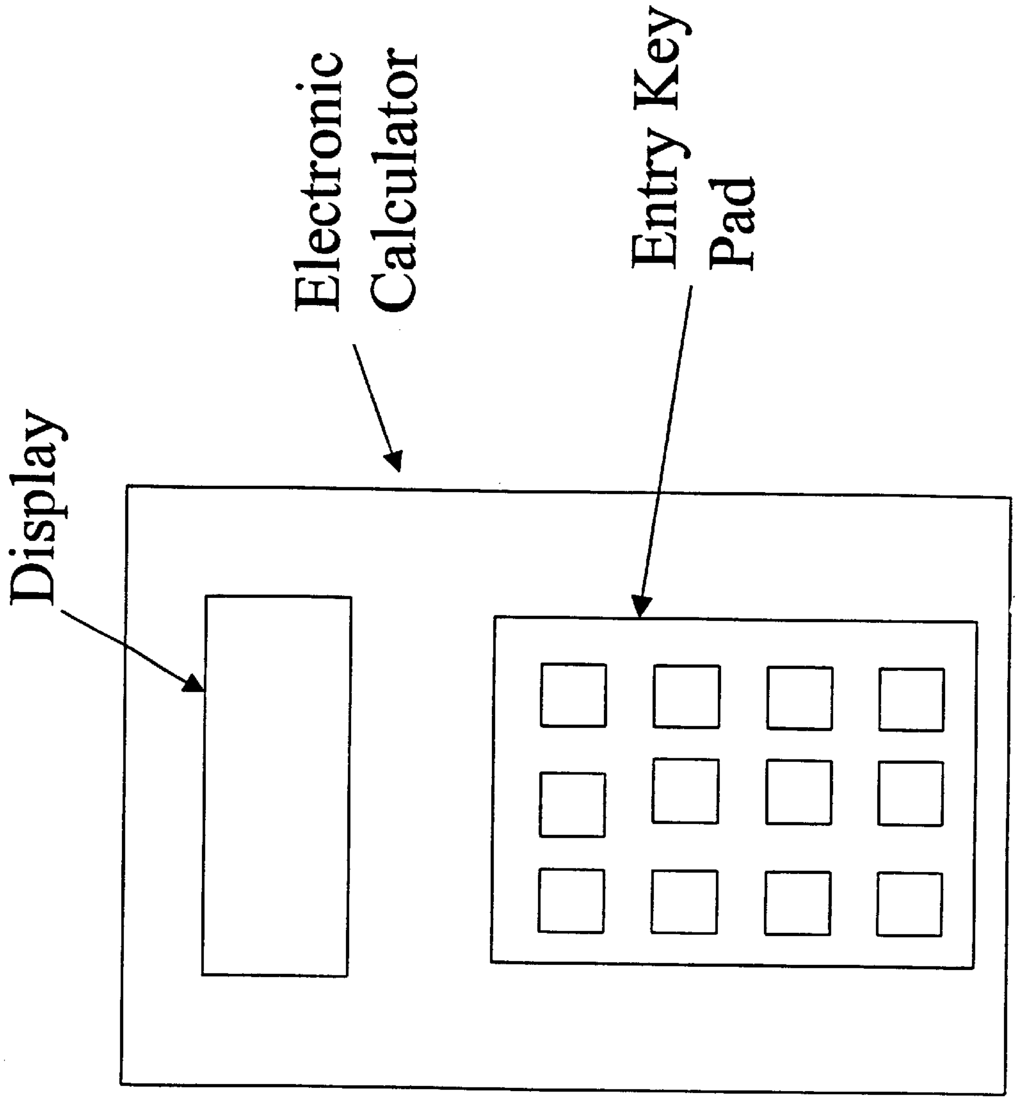
FIG. 1 is a top plan view of a calculating device suitable for the method of the present invention.

The expected return (from the player's perspective) of a "flat" (i.e., non-progressive) reel slot machine can be calculated if the probabilities and payouts of all the winning combinations are known. Since the probabilities and payouts are fixed, the expected return of a flat reel slot machine is fixed. In mathematical terms, the expected return $R_{Flat}$ of a flat reel slot machine can be expressed as:

$$R_{Flat} = \sum_{i=1}^{n} p_i w_i \quad [1]$$

where $R_{Flat}$ is the expected return of the flat reel slot machine, expressed as a percentage;

$p_i$ is the probability of hitting the ith winning combination, expressed as a percentage;

$w_i$ is the payout for hitting the ith winning combination, expressed as a multiple of the bet; and n is the number of winning combinations.

The return of a flat reel slot machine as viewed from the operator's perspective is the same as that viewed from the player's perspective. Also, the returns and probabilities are intended to be expressed as percentages, throughout this disclosure. However, it can be appreciated that returns and probabilities can be expressed in decimal form. Also, as will be clear to one skilled in the art, probabilities (in decimal or percentage form) can also be expressed as odds (typically in ratio form). Therefore, while the following description is in terms of probabilities, it is equally valid to use and consider odds in the method of the invention.

The expected return of a progressive reel slot machine, from the player's perspective, $R_{Prog(P)}$ varies depending on the current amount of the progressive jackpot. Therefore, this value is stated as the current expected progressive return. Using the above formula if w1 is replaced by the amount of the current progressive Jackpot $J_p$, and p1 is replaced by the probability of hitting the progressive jackpot α, then the current expected progressive return $R_{Prog(P)}$ of a progressive reel slot machine (from the player's perspective) can be expressed as:

$$R_{Prog(P)} = \alpha J_p + \sum_{i=2}^{n} p_i w_i \quad [2]$$

where $R_{Prog(P)}$ is the current expected progressive return of a progressive reel slot machine, from the player's perspective;

α is the probability of hitting the progressive jackpot, expressed as a percentage;

$J_p$ is the current amount of the progressive jackpot, expressed as a multiple of the qualifying bet D;

$p_i$ is the probability of hitting the ith winning combination, expressed as a percentage;

$w_i$ is the payout for hitting the ith winning combination, expressed as a multiple of the qualifying bet D; and n is the total number of winning combinations (where i=1 is the jackpot).

The second term of the above equation [2] (i.e., $\Sigma\, p_i w_i$, i=2 to n), is here referred to as the "truncated return", or $R_T$. That is, the return of the progressive reel slot machine without regard to the progressive jackpot. It can be appreciated that the "truncated return" $R_T$ of the progressive reel slot machine is fixed and does not depend on the amount of the progressive jackpot. Thus, the current expected progressive return $R_{Prog(P)}$ can be expressed as:

$$R_{Prog(P)} = \alpha J_p + R_T \quad [3]$$

where $R_{Prog(P)}$ is the current expected progressive return of a progressive reel slot machine, from the player's perspective;

α is the probability of hitting the progressive jackpot, expressed as a percentage;

$J_p$ is the current amount of the progressive jackpot, expressed as a multiple of the qualifying bet D; and $R_T$ is the truncated return as defined with respect to equation [2].

The current expected progressive return, from the player's perspective, of a progressive reel slot machine $R_{Prog(P)}$ can also be expressed as:

$$R_{Prog(P)} = mJ_d + R_T \quad [4]$$

where $R_{Prog(P)}$ is the current expected progressive return of a progressive reel slot machine, from the player's perspective m is the probability of hitting the progressive jackpot α (expressed as a percentage) divided by the amount of the qualifying bet D;

$J_d$ is the current amount of the progressive jackpot, in, e.g., dollars; and $R_T$ is the truncated return, as defined above with respect to equation [2].

The term "flat return" $R_o$ will be used herein to mean the return of the progressive reel slot machine, from the player's perspective, when the jackpot is at the reset (or minimum) value $J_o$. Thus the flat return $R_o$ can be expressed as:

$$R_o = \alpha J_o + R_T \quad [5]$$

where $R_o$ is the flat return of a progressive reel slot machine;

α is the probability of hitting the jackpot, expressed as a percentage;

$J_o$ is the amount of the reset value of the jackpot expressed as a multiple of the qualifying bet D; and $R_T$ is the truncated return as defined in with respect to equation [2].

Using equations [3] and [5], the current expected progressive return $R_{Prog(P)}$, from the player's perspective, can be expressed using the flat return $R_o$, as:

$$R_{Prog(P)} = \alpha(J_p - J_o) + R_o \quad [6]$$

where $R_{Prog(P)}$ is the current expected progressive return of a progressive reel slot machine, from the player's perspective;

α is the probability of hitting the progressive jackpot, expressed as a percentage;

$J_p$ is the current amount of the progressive jackpot, expressed as a multiple of the qualifying bet D;

$J_o$ is the amount of the reset value of the jackpot, expressed as a multiple of the qualifying bet D; and $R_o$ is the flat return as defined in equation [5].

Given the above formulas [3], [4] or [6], the current expected progressive return of a progressive reel slot machine at any given point in time can be determined by knowing: (1) the probability of hitting the progressive jackpot, (2) the amount of the progressive jackpot, (3) the amount of the qualifying bet, and (4) either (a) the "truncated return" of the progressive reel slot machine, or (b) the "flat return" and the reset amount of the jackpot. However, casinos and other operators of progressive reel slot machines have heretofore had a strict policy of not disclosing such information.

Progressive reel slot machines can also have multiple progressive jackpots each having a different payout amount ($J_{pi}$) and a different probability ($\alpha_i$). If the total number of progressive jackpots is "k", and the total number of winning combinations (progressive and non-progressive) is "n", then the current expected progressive return for a multiple progressive jackpot reel slot machine can be expressed as follows:

$$R_{Multi\text{-}Prog(P)} = \sum_{i=1}^{k} \alpha_i J_{pi} + \sum_{i=k+1}^{n} p_i w_i \quad [7]$$

where $J_{pi}$ is the current amount of each progressive jackpot (i=1 to k), expressed as a multiple of the qualifying bet D which can also be expressed as:

$$R_{Multi\text{-}Prog(P)} = \sum_{i=1}^{k} \alpha_i J_{oi} + R_T \quad [8]$$

where $J_{oi}$ is the reset amount of each progressive jackpot (i=1 to k), expressed as a multiple of the qualifying bet D; or, as:

$$R_{Multi\text{-}Prog(P)} = \sum_{i=1}^{k} \alpha_i (J_{pi} - J_{oi}) + R_o \quad [9]$$

It will be appreciated by one skilled in the art that the methods disclosed herein with respect to single progressive jackpot reel slot machines are equally applicable to such machines having multiple progressive jackpots.

The return of a progressive reel slot machine, as viewed from an operator's perspective, is not the same as that viewed from a player's perspective. The expected progressive return, from an operator's perspective is fixed. This is because operators consider the money contributed to and accumulated in the progressive jackpot to be the "player's money". Thus, the expected return of a progressive reel slot machine, from an operator's perspective, $R_{Prog(O)}$, is equal to the flat return of the machine $R_o$, plus the progressive increment u (referred to in the Background of the Invention), which can be expressed as:

$$R_{Prog(O)} = R_o + u;$$

where $R_{Prog(O)}$ is the expected return of a progressive reel slot machine, from an operator's perspective;

$R_o$ is the flat return; and u is the progressive increment.

It can be appreciated that since the flat return of the progressive reel slot machine $R_o$ and the progressive increment u are fixed, then the expected return of a progressive reel slot machine, from an operator's perspective, $R_{Prog(O)}$, is also fixed. Thus, the expected progressive return, from an operator's perspective, does not depend on the amount of the progressive jackpot. Therefore, an operator is not concerned with which particular machine a player chooses from its group of otherwise equivalent machines. An operator is concerned with increasing the overall amount of total gaming activity (or "handle") that the group of machines attract. The operator can increase gaming activity by increasing the attraction, interaction and entertainment value of the progressive slot machines by providing the critical parameters and a means to determine the current expected progressive return, from the player's perspective.

With respect to multiple-progressive jackpot machines, the invention comprises posting or publishing, preferably on or adjacent to the progressive reel slot machine itself, information related to the following critical parameters: (1) the probability of hitting the progressive jackpots, (2) the amount of the progressive jackpots, (3) the amount of the qualifying bet, and (4) either (a) the truncated return of the progressive reel slot machine, or (b) the flat return and the reset values of the jackpots. Also, the player is provided with the equations and/or means to calculate the current expected progressive return given the posted information. Depending on the posted information, the calculating means can employ one of the above equations [3], [4], or [6] through [9], or an equivalent method.

Alternatively, the progressive reel slot machine can include components and programming to calculate the current expected progressive return of the progressive reel slot machine in "real time", and can be equipped to display such return in raw or encoded form. Thus, the progressive reel slot machine can include electrical and/or mechanical computing components to calculate the current expected progressive return, and can include a display device to display the calculated current expected progressive return. The computing components can include a memory device (e.g., RAM and/or ROM, or the like) to store the current critical parameters of the machine, and the calculated current expected progressive return (i.e., the current state of the machine), a processor (i.e., CPU) connected to the memory device, which processor is programmed with one of the above algorithms (or a similar algorithm), and an LED, Liquid Crystal Display (LCD), or similar display device connected to the processor and/or memory device.

As an alternative to displaying the truncated return of the progressive reel slot machine, the method of the invention involves posting information, which allows the player to determine or calculate the truncated return. As stated above, the truncated return is the sum of the returns of each lesser winning combination of the progressive reel slot machine without regard to the progressive jackpot (i.e., the sum of the returns of each winning combination other than the progressive jackpot). This sum can be expressed as:

$$R_T = \sum_{i=2}^{n} R_i \quad [11]$$

Where $R_i = p_i w_i$ $p_i$ is the probability of hitting the ith winning combination, expressed as a percentage;

$w_i$ is the payout for hitting the ith winning combination, expressed as a multiple of the qualifying bet D; and n is the total number of winning combinations (including the jackpot as i=1).

Thus, as a means to calculate or determine the truncated return, the invention contemplates posting either (1) the returns ($R_i$) for each lesser winning combination, or (2) the probability ($p_i$) of hitting each lesser winning combination and the payout (wi) of each lesser winning combination. Alternatively, the returns of certain lesser winning combinations can be posted along with the probabilities and payouts of the remaining lesser winning combinations. The payouts ($w_i$), can be expressed as a multiple of the qualifying bet (D), or can be expressed in dollar amounts, if the amount of the qualifying bet (D) is posted or otherwise known. Given the above information, the player can determine the truncated return by summing the products of the payouts and probabilities of each lesser winning combination for which such information is posted, and adding any posted returns for other lesser winning combinations. For simplicity, it is intended that the likelihood of the occurrence of a winning combination be expressed as a probability (i.e., a percentage or decimal number). However, as stated above, this can be expressed as odds, (which is typically expressed as a ratio). Also it can be appreciated that returns can be posted as a single number (already summed) or as a plurality of separate numbers (to be summed).

The probability of hitting a winning combination (either a lesser winning combination or the combination required for the progressive jackpot) is by definition equal to the probability that a predetermined combination of symbols (e.g., 3 diamonds, 3 oranges, etc.) will appear in the predetermined winning position(s), such as on the "pay line" of the machine, or elsewhere. Therefore, the probability of hitting a certain winning combination can be determined by knowing (and multiplying) the probabilities that the predetermined symbols will appear in the predetermined winning position(s) on the machine in the predetermined order and/or quantity.

Therefore, as an alternative to posting a probability of hitting a given lesser winning combination ($p_{i=2\ to\ n}$), or the probability of hitting the progressive jackpot ($\alpha$), the invention contemplates posting the probabilities that the predetermined symbols will appear in the predetermined winning positions for each reel of the progressive reel slot machine. As above, for simplicity, it is intended that the likelihood of the occurrence of a symbol appearing in the winning position(s) be expressed as a probability (i.e., a percentage or decimal number). However, this can be expressed as odds (i.e., a ratio).

The predetermined combinations and winning locations of symbols required for the winning combinations are commonly posted on slot machines. Therefore, knowing the winning combinations, the player can then determine the probability of hitting a certain winning combination by multiplying the probabilities of the symbol or symbols appearing in the predetermined winning position(s) for each reel. For the lesser winning combinations, the products (probabilities) can then be used to determine the truncated return of the machine in accordance with method described above.

As an alternative to posting the probability of hitting the progressive jackpot $\alpha$, the invention contemplates posting a current return of the progressive jackpot ($R_p$), which is defined as the probability of hitting the progressive jackpot multiplied by the current amount of the progressive jackpot, expressed as a multiple of the qualifying bet. In mathematical terms, this can be expressed as: $R_p=\alpha J_p$. Since the current return of the progressive jackpot ($R_p$) is a function of the current amount of the progressive jackpot, which changes, the current return of the progressive jackpot ($R_p$) must be calculated after each change of the progressive jackpot amount. Preferably, the calculation of the current return of the progressive jackpot ($R_p$) is made by a computer in the progressive reel slot machine and is displayed on a display device, as described above.

As a further alternative, the invention contemplates: (1) posting a dynamic (i.e., changing) return comprising a current return of the progressive jackpot ($R_p$) (as defined above) combined (i.e., summed) with a collective return including combined (summed) returns ($R_i$) of one or more of the lesser winning combinations (e.g., i=2 to 4), and (2) posting one or more static (i.e., fixed) returns comprising combined (summed) returns ($R_i$) of the remaining lesser winning combinations (e.g., i=5 to 7). For multiple progressive jackpot machines, the invention contemplates the option of posting multiple dynamic returns, each of which incorporates one or more of the current returns of the progressive jackpots.

As a further alternative, the invention contemplates posting a dynamic return, one or more static returns and one or more sets of probabilities and jackpots, the combination of which would enable a player to determine the current expected progressive return. As above, the dynamic return(s) will change with the amount of the progressive jackpot. Therefore, the dynamic return(s) may be suitably calculated by the progressive reel slot machine and displayed, as above.

In yet another alternative, the invention contemplates posting two or more numbers wherein one or both of the posted numbers represents an arbitrary amount of the total current expected return, which arbitrary amount is not equal to any sum of the returns of any progressive awards and lesser winning combinations. For example, if the current expected progressive return is 105%, 20% of which is attributable to the progressive jackpot and 85% of which is attributable to the truncated return of the machine, then an arbitrary split of those two returns can be posted, such as 25% and 80%.

In the above example, a predetermined, arbitrary amount (5%) was added to the progressive return and the same amount was deducted from the flat return. It can be appreciated that other more complex operations can be performed with similar results.

A further method of the invention comprises an automated notification to the player, which is activated when the current expected progressive return attains a predetermined level (e.g. 100%). Such notifications could take the form of a text message, lights, sounds, or any other suitable mode of notification.

It may be desirable to combine and/or encode the information to simplify the calculation procedure and/or to limit availability and disclosure of the critical parameters of the machine. In this manner, unfettered disclosure of the critical parameters of the machines can be avoided, if desired. In addition, the use of the method can be limited to certain establishments and/or to "authorized" or "selected" players who are in possession of the means to calculate/decode the current progressive expected return.

For example, in one embodiment, the (fixed) probability of hitting the progressive jackpot $\alpha$ can be divided by the (also fixed) amount of the qualifying bet D to produce the "m" value of equation [4]. This "m" value, and the truncated return $R_T$ can be posted on the progressive reel slot machine along with the amount of the current progressive jackpot $J_q$. Thus, a player using a calculating means employing equation [4] would be able to determine the current expected progressive return of the machine given the "m" value and the truncated return.

The probability of hitting the progressive jackpot $\alpha$ (expressed as a percentage) is usually much less than one (usually between 0.001% and 0.1%). In addition the qualifying bet D is usually between 0.5 and 25 dollars. Thus the "m" value ($m=\alpha/D$) is usually a number much less than 1 which can be difficult for a player to read and/or understand, even if expressed in scientific notation. Therefore, to increase the ease of use of the method, and to simultaneously further encode the critical parameters of the machine, a symbol or a number related to the "m" value can be used in place of the used in place of the actual numerical "m" value. For example, an (encoded) letter or symbol can replace the "m" value of a particular progressive reel slot machine, either of which corresponds to a letter or symbol associated with a calculating procedure or means. Alternatively, the "m" value can be replaced by a number $\mu$ equal to the logarithm of the "m" value based on a small number "a", such as:

$$\mu = \log_a(m) + 50; \qquad [12]$$

where a is a constant equal to, for example, $10^{1/10}$; and m is the probability of hitting the progressive jackpot $\alpha$ (expressed as a percentage) divided by the qualifying bet D.

In this manner the "m" value of a particular machine can be better represented by the "$\mu$" value, which can be an integer from, for example, 0 to 50. The truncated and flat returns of progressive reel slot machines typically vary between about 80% and 99%. Similar to the "m"value, the truncated return $R_T$ (or the flat return $R_o$) can be posted in raw form or symbolic/encoded form on the progressive reel slot machine.

Any posted information (i.e., the critical parameters or other information) can be presented in encoded form by any suitable manner. For example, the information can be encrypted as an alphanumeric string, using any suitable encryption algorithm. For instance, the information can be presented as a continuous string such that one part of the string represents one parameter (e.g., the "m" value or flat return $R_o$) and another part of the string represents another parameter (e.g., the truncated return $R_T$ or the reset value of the jackpot $J_o$). Or, the encoding may be such that the entire string encodes, in combined form, two or more parameters of the machine. For example, two or more of the above parameters could be encoded according to a suitable encryption or encoding method into a single code, which can be decoded by a device or method designed to decode such an encryption or encoding method.

Referring to FIG. 1, to calculate the current expected progressive return using the posted information, the players are preferably provided with a calculating means designed to use one of the above equations (or a variation thereof). To the extent allowed by applicable gaming laws and regulations, the calculating means can be in the form of an inexpensive electronic calculating device pre-programmed with one of the above equations (or an equivalent thereof), which device is designed to accept input in the predetermined, posted form. Thus, if the critical information were posted on the individual progressive reel slot machines, the player would be required to approach the machine to read the information. He or she would then enter the information into an electronic device, which would calculate and display the current expected progressive return. Based on the number produced, the player could then choose to play the machine at that time, or decide to search for a machine with a better return. The electronic calculating device is preferably designed to be used exclusively for the purposes of determining the current expected progressive return of progressive reel slot machines. In addition, individual operators can encode the posted information and design the programming of the electronic calculator device such that a particular type of device must be used at their facilities. Alternatively, the calculating means can be in the form of a slide rule employing one of the above equations (or an equivalent).

Preferably, the electronic calculating device includes a memory, a processing unit, a display device (e.g., a LCD or LED display) and a keypad, for entering values. The calculating device is pre-programmed with one of the above equations and is operable to receive input from the player of the values of the variables in the equation. The keypad can include number keys (e.g., 0 through 9, and a decimal key) and/or keys labeled with names or symbols representing the parameters used in the equation (e.g., Jackpot Amount (J), Jackpot Probability ($\alpha$), Truncated Return ($R_T$), etc.). Preferably, to enter a value for a parameter, the player enters the value using the number keys and then depresses the corresponding symbol (or name) key representing the parameter. Preferably, the electronic calculating device is programmed to prompt the player, through the display, as to which parameter to enter. Upon entry of all of the variables for the pre-programmed equation, the electronic calculating device computes the current expected progressive return of the machine and displays the calculated return on the display. If any of the parameters are posted in encoded form, the calculating device is programmed to interpret (i.e., decode) such parameters when calculating the current expected progressive return.

The publishing or posting of the critical parameters, in raw or encoded form, will increase player attraction to and interaction with the progressive reel slot machines. This will enhance the entertainment value of the machines and increase gaming activity. The increase in gaming activity benefits the machine operators, which depend on such activity. The method benefits the players by providing enhanced entertainment value and the ability to choose the return received for each bet.

Other Progressive Games

The invention is also applicable to other games and gaining machines with one or more progressive components (i.e., payouts or jackpots), such as the progressive versions of Caribbean Stud poker, video poker and keno, or the like. As with progressive reel slot machines, one component of the total expected return of these games is fixed and another component (which encompasses the progressive jackpot) varies with the progressive payout. Such other games and gaming machines can be based soley on chance (e.g., keno) or can include an element of skill (e.g., video poker).

In Caribbean Stud poker, the player first places a bet in the ante box, and receives five cards face down. The dealer gets four cards face down and one card face up. The player examines his hand and decides to fold (forfeiting the ante), or to make a bet wager that is double his ante.

The dealer qualifies with an Ace-King combination, or better. Hands thereafter are ranked according to traditional poker rankings. If the dealer does not qualify, the player's ante wager is paid even money (1 to 1) and the bet wager is a push (no action is taken on the bet wager). If the dealer qualifies and the player's hand is higher in rank than the dealer's hand, the player collects even money on the ante and is paid according to a paytable on the bet wager. If the dealer qualifies and the dealer's hand is higher in rank than the player's hand, the player loses both the ante and bet wagers.

While making the ante wager, the player may place an additional $1.00 wager on a progressive bet by depositing a $1.00 gaming chip into the progressive bet acceptor device in front of that player's ante box. The progressive bet is paid out according to the rank of the player's hand, regardless of the outcome of the ante and bet wagers (even if the dealer does not qualify). The progressive bet is typically paid out according to the following table:

| | |
|---|---|
| Royal Flush | 100% of progressive jackpot |
| Straight Flush | 10% of progressive jackpot |
| Four of a Kind | $500.00 |
| Full House | $100.00 |
| Flush | $50.00 |

Assuming the player makes the minimum ante bet, the progressive bet, and the bet wager in accordance with optimal strategy, the expected return of Caribbean Stud Poker from the player's perspective can be expressed as:

$$R=mJ+b$$

The value J is the amount of the progressive jackpot. The constant value m is the sum of the probabilities of drawing those winning hands which pay a portion of the progressive jackpot, each reduced to the fraction of the jackpot which that winning combination pays (e.g., 1 for Royal Flush, 1/10 for Straight Flush), divided by the total initial bet (i.e., the progressive bet plus the ante wager). (The value m is analogous to the probability of hitting the progressive jackpot, divided by the qualifying bet, of a progressive reel slot machine). The constant value b is equal to the sum of the products of the probabilities and payouts of the other "progressive" winning combinations, which pay a fixed amount (e.g. Four of a Kind, etc.) plus the sum of the products of the probabilities and payouts of the ante wager and bet wager. (The value b is analogous to the "truncated" return of a progressive reel slot machine).

These constants, optionally encoded, can be displayed, for example, on the table sign that gives the minimum bet, thus enabling the player to determine the current expected return of the machine. The amount of the progressive jackpot is typically displayed on the machine. It can be appreciated that other methods of providing information sufficient to determine the correct expected return of the machine, such as those described above with respect to progressive reel slot machines, are also within the scope of the invention.

In Keno, there are 80 balls numbered 1 through 80. In each game, a predetermined number of (e.g., 20) of balls are selected at random, and the results are posted on a display board. Before the game, players select from, for example, 1 to 20 numbers. For each possible choice of 1 to, e.g., 20 of the numbers selected, there is a separate paytable (e.g., 20 paytables), which have awards depending on the number of "hits" (numbers correctly chosen). The awards depend on the size of the bet the player makes.

Any award in a given paytable can be designated as a progressive jackpot. If a progressive jackpot is designated for a given paytable, the bet size required to qualify for the progressive jackpot is displayed.

For each paytable with a progressive jackpot, the probabilities of winning each award, including the progresssive jackpot, can be calculated through combinatorial analysis. Given these probabilities, the expected return from the player's perspective can be expressed as:

$$R=mJ+b$$

The value J is the value of the progressive jackpot. The constant value m is the probability of winning the progressive award (i.e., getting the predetermined number of hits) (analogous to the probability of hitting the jackpot, divided by the qualifying bet, of the progressive reel slot machine). The constant b is the combined net returns of the other awards of the paytable (analogous to the "truncated" return of a progressive reel slot machine).

The progressive jackpot of the Keno machine is typically displayed on or adjacent to the machine. The constants, optionally encoded, can be associated with the respective paytable and can be displayed, for instance, near the progressive jackpot display. As above, other display options are contemplated. Thus, given the methods above, the user is able to determine the current expected return of the machine.

In video poker, a player is dealt 5 cards face up from a standard deck of cards. The player then has the option of holding or discarding each of the 5 cards by pressing buttons in front of the corresponding cards. The player then hits the draw button, receiving new cards for the discarded cards. The player's final hand, so obtained, then determines a payout according to a paytable, which is typically presented on the front of the machine.

For each initial set of 5 cards to the player, there is an optimal hold strategy, based upon the paytable. The optimal hold strategy is to hold that set of cards that maximizes the player return for the given starting hand. The optimal strategies for each type of machine can be determined based on the probabilities of obtaining each hand and their payouts. With optimal play, the probabilities of obtaining each of the awards in the paytable can be calculated mathematically.

In progressive video poker, one rank of poker, (usually the Royal Flush but sometimes the Five of a Kind) is designated as the rank which receives the progressive jackpot. The player typically must make the maximum (i.e., qualifying) bet to qualify for the progressive jackpot.

For a fixed playing strategy, the probabilities of each final hand can be calculated mathematically. This includes the probability of hitting the progressive jackpot. Thus the player viewpoint return can then be expressed as $$R=mJ+b$$

The value J is the amount of the progressive jackpot, the value m is the probability of drawing the progressive hand, divided by the qualifying bet, and b is the "truncated" return of the game, both of which vary with the playing strategy employed. These constants, optionally encoded, can be displayed on the machine to enable the user to determine the current expected return (for a predetermined playing strategy).

A complication arises because the optimal playing strategy varies as the progressive jackpot amount increases. Thus, with optimal play, m and b vary with and are functions of the progressive jackpot. However, the m and b values at a jackpot corresponding to a predetermined optimal player return (e.g. 100%) can be displayed. Thus the player-determined returns near 100% would be very close to the true values. A more exact choice would be to implement a method whereby a "return" meter, or the like, displays the return at any given time, in accordance not only with the changing jackpot but also with an internal program that calculates the return according to the (changing) optimal strategy. This can be implemented similarly to the calculating components of a progressive reel slot machine discussed above.

It should be understood, of course, that the specific form of the invention herein illustrated and described is intended to be representative only, as certain changes may be made therein without departing from the clear teachings of the disclosure. Accordingly, reference should be made to the following appended claims in determining the full scope of the invention.

We claim:

1. A method of operating a progressive game, comprising:

posting or publishing one or more information items sufficient to determine a current expected progressive return of the progressive game, said information items being located on, or adjacent a location of, the game, and said information items being posted or published prior to commencement of play of the game to enable a player to determine the current expected progressive return of the progressive game prior to commencement of play.

2. The method of claim 1, wherein one of said information items is a truncated return of the game.

3. The method of claim 1, wherein one of said information items is a probability of hitting a progressive jackpot of the game.

4. The method of claim 1, wherein one of said information items is a probability of hitting a lesser winning combination of the game.

5. The method of claim 1, wherein one of said information items is a return of a progressive jackpot of the game.

6. The method of claim 1, wherein said information items include a static return and a dynamic return of the game.

7. The method of claim 6, wherein said information items include a payout and probability of a lesser winning combination of the game.

8. The method of claim 1, wherein said information items include a static return and include multiple dynamic returns, each dynamic return corresponding to one of a plurality of progressive jackpots of the game.

9. The method of claim 1, wherein said information items include two arbitrary numbers, each arbitrary number not being equal to any sum of returns of any progressive awards and lesser winning combinations.

10. The method of claim 1, wherein said game is implemented on a gaming machine; and said gaming machine includes means to automatically announce the existence of a predetermined current expected progressive return.

11. The method of claim 1, wherein said game is implemented on a gaming machine; and said gaming machine includes means to calculate and display a current expected progressive return.

12. The method of claim 1, wherein said game is progressive Caribbean Stud poker; and said information items include:

a current amount of a progressive jackpot;

a sum of probabilities of drawing winning hands which pay a portion of the progressive jackpot, each probability being reduced to a fraction of the progressive jackpot which an associated winning hand pays; and a sum of products of probabilities and payouts of all lesser winning hands.

13. The method of claim 1, wherein:

said game is progressive keno and includes a plurality of paytables; and said information items include, for a plurality of paytables:

a current amount of a progressive jackpot for one paytable;

a probability of winning a progressive award for said one paytable;

a sum of returns of all lesser winning combinations for said one paytable.

14. The method of claim 1, wherein:

said game is progressive video poker and is implemented on a gaming machine; and said information items include:

a current amount of a progressive jackpot;

a probability of drawing a progressive hand, at a predetermined optimal player return; and a sum of returns of all lesser winning combinations, at said predetermined optimal player return.

15. The method of claim 1, wherein:

said game is video poker and is implemented on a gaming machine;

said information items include:

a current amount of a progressive jackpot;

a probability of drawing a progressive hand; and a sum of returns of all lesser winning combinations; and said gaming machine includes means to calculate and display said probability of drawing said progressive hand and said sum of return of all lesser winning combinations based on a predetermined optimal playing strategy.

16. A method of operating a progressive game, comprising:

posting or publishing one or more information items sufficient to determine a current expected progressive return of the progressive game to enable a player to choose which machine to play based on the current expected progressive return, and said information items being located on, or adjacent a location of, the game.

17. The method of claim 16, wherein one of said information items is a truncated return of the game.

18. The method of claim 16, wherein one of said information items is a probability of hitting a progressive jackpot of the game.

19. The method of claim 16, wherein one of said information items is a probability of hitting a lesser winning combination of the game.

20. The method of claim 16, wherein one of said information items is a return of a progressive jackpot of the game.

21. The method of claim 16, wherein said information items include a static return and a dynamic return of the game.

22. The method of claim 21, wherein said information items include a payout and probability of a lesser winning combination of the game.

23. The method of claim 16, wherein said information items include a static return and include multiple dynamic returns, each dynamic return corresponding to one of a plurality of progressive jackpots of the game.

24. The method of claim 16, wherein said information items include two arbitrary numbers, each arbitrary number not being equal to any sum of returns of any progressive awards and lesser winning combinations.

25. The method of claim 16, wherein said game is implemented on a gaming machine; and said gaming machine includes means to automatically announce the existence of a predetermined current expected progressive return.

26. The method of claim 16, wherein said game is implemented on a gaming machine; and said gaming machine includes means to calculate and display a current expected progressive return.

27. The method of claim 16, wherein said game is progressive Caribbean Stud poker; and said information items include:

a current amount of a progressive jackpot;

a sum of probabilities of drawing winning hands which pay a portion of the progressive jackpot, each probability being reduced to a fraction of the progressive jackpot which an associated winning hand pays; and a sum of products of probabilities and payouts of all lesser winning hands.

28. The method of claim 16, wherein:

said game is progressive keno and includes a plurality of paytables; and said information items include, for a plurality of paytables:

a current amount of a progressive jackpot for one paytable;

a probability of winning a progressive award for said one paytable;

a sum of returns of all lesser winning combinations for said one paytable.

29. The method of claim 16, wherein:

said game is progressive video poker and is implemented on a gaming machine; and said information items include:

a current amount of a progressive jackpot;

a probability of drawing a progressive hand, at a predetermined optimal player return; and a sum of returns of all lesser winning combinations, at said predetermined optimal player return.

30. The method of claim 16, wherein:

said game is video poker and is implemented on a gaming machine;

said information items include:

a current amount of a progressive jackpot;

a probability of drawing a progressive hand; and a sum of returns of all lesser winning combinations; and said gaming machine includes means to calculate and display said probability of drawing said progressive hand and said sum of return of all lesser winning combinations based on a predetermined optimal playing strategy.

* * * * *